(12) United States Patent
Devos

(10) Patent No.: US 10,907,363 B2
(45) Date of Patent: Feb. 2, 2021

(54) FLOOR PANEL FOR FORMING A FLOOR COVERING

(71) Applicant: FLOORING INDUSTRIES LIMITED, SARL, Bertrange (LU)

(72) Inventor: Pieter Devos, Koolskamp (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 16/069,950

(22) PCT Filed: Jan. 12, 2017

(86) PCT No.: PCT/IB2017/050148
§ 371 (c)(1),
(2) Date: Jul. 13, 2018

(87) PCT Pub. No.: WO2017/122143
PCT Pub. Date: Jul. 20, 2017

(65) Prior Publication Data
US 2019/0024388 A1 Jan. 24, 2019

(30) Foreign Application Priority Data
Jan. 15, 2016 (BE) .................. 2016/5033

(51) Int. Cl.
*E04F 15/10* (2006.01)
*E04F 15/02* (2006.01)
*B32B 3/06* (2006.01)

(52) U.S. Cl.
CPC .............. *E04F 15/107* (2013.01); *B32B 3/06* (2013.01); *E04F 15/02038* (2013.01);
(Continued)

(58) Field of Classification Search
CPC ............ E04F 15/02038; E04F 2201/03; E04F 2201/04; E04F 2201/045; E04F 2201/048;
(Continued)

(56) References Cited

U.S. PATENT DOCUMENTS 8,038,363 B2 * 10/2011 Hannig ..................... B27F 1/04
403/339
8,191,334 B2 * 6/2012 Braun ..................... E04F 15/02
52/588.1
(Continued)

FOREIGN PATENT DOCUMENTS

EP 2591183 A2 5/2013
WO 9747834 A1 12/1997
(Continued)

OTHER PUBLICATIONS

Belgian Search Report from BE Application No. BE 201605033, dated Oct. 25, 2016.
(Continued)

*Primary Examiner* — Jessie T Fonseca
(74) *Attorney, Agent, or Firm* — Workman Nydegger

(57) ABSTRACT

A floor panel for forming a floor covering comprises a pair of edges provided with coupling parts allowing to couple two of such floor panels to each other by means of a rotation movement. The coupling parts are realized in the form of a tongue and a groove with locking parts. The groove is bordered by an upper lip and a lower lip which comprises a locking part in the form of an upward-directed locking part. The upward-directed part extends over a height which is more than 0.1 times the thickness of the floor panel.

19 Claims, 3 Drawing Sheets

(52) U.S. Cl.
CPC ........ *E04F 15/105* (2013.01); *B32B 2419/04* (2013.01); *E04F 2201/0138* (2013.01); *E04F 2201/0146* (2013.01); *E04F 2201/0153* (2013.01); *E04F 2201/023* (2013.01); *E04F 2201/043* (2013.01)

(58) Field of Classification Search
CPC ................ E04F 2201/049; E04F 15/02; E04F 2201/021; E04F 2201/023; E04F 2201/0123; E04F 2201/013; E04F 2201/0138; E04F 2201/0146; E04F 15/10; E04F 15/105
See application file for complete search history.

(56) References Cited

U.S. PATENT DOCUMENTS

| | | | | |
|---|---|---|---|---|
| 8,375,672 | B2 * | 2/2013 | Hannig | E04F 15/02038 52/588.1 |
| 8,726,604 | B2 * | 5/2014 | Hannig | E04F 15/02 52/516 |
| 9,260,870 | B2 * | 2/2016 | Vermeulen | E04F 15/02038 |
| 9,650,792 | B2 * | 5/2017 | Ramachandra | E04F 15/02016 |
| 9,670,682 | B2 * | 6/2017 | Cappelle | E04F 15/02194 |
| 9,670,683 | B2 * | 6/2017 | Cappelle | E04F 15/02194 |
| 2003/0145549 | A1 * | 8/2003 | Palsson | B44C 3/123 52/589.1 |
| 2004/0128934 | A1 * | 7/2004 | Hecht | E04F 15/02 52/578 |
| 2004/0211143 | A1 * | 10/2004 | Hanning | E04F 15/02 52/578 |
| 2004/0250492 | A1 * | 12/2004 | Becker | E04F 15/04 52/578 |
| 2007/0130872 | A1 * | 6/2007 | Goodwin | E04F 15/02 52/592.1 |
| 2008/0241440 | A1 * | 10/2008 | Bauer | E04F 15/02 428/33 |
| 2008/0245020 | A1 * | 10/2008 | Kiefel | E04F 13/08 52/588.1 |
| 2009/0133353 | A1 * | 5/2009 | Pervan | E04F 15/02 52/588.1 |
| 2010/0031594 | A1 * | 2/2010 | Liu | E04F 15/02 52/403.1 |
| 2010/0037550 | A1 * | 2/2010 | Braun | E04F 15/02 52/588.1 |
| 2010/0293879 | A1 * | 11/2010 | Pervan | E04F 15/02 52/588.1 |
| 2010/0300029 | A1 * | 12/2010 | Braun | E04F 15/02 52/588.1 |
| 2011/0131909 | A1 * | 6/2011 | Hannig | E04F 15/02 52/309.1 |
| 2011/0138722 | A1 * | 6/2011 | Hannig | E04F 15/02 52/309.1 |
| 2011/0271632 | A1 * | 11/2011 | Cappelle | E04F 15/02 52/582.2 |
| 2012/0096801 | A1 * | 4/2012 | Cappelle | E04F 15/02038 52/592.1 |
| 2012/0180416 | A1 * | 7/2012 | Perra | E04F 15/02 52/309.1 |
| 2012/0266555 | A1 * | 10/2012 | Cappelle | E04F 15/02194 52/309.1 |
| 2013/0036695 | A1 * | 2/2013 | Durnberger | E04F 15/02038 52/309.3 |
| 2013/0042558 | A1 * | 2/2013 | Cordeiro | E04F 15/02038 52/403.1 |
| 2013/0097959 | A1 * | 4/2013 | Michel | E04F 15/02 52/588.1 |
| 2013/0104486 | A1 * | 5/2013 | Windmoller | E04F 15/02 29/428 |
| 2013/0212971 | A1 * | 8/2013 | Cordeiro | E04F 13/0894 52/588.1 |
| 2013/0276398 | A1 * | 10/2013 | Hannig | E04F 15/02038 52/588.1 |
| 2013/0309441 | A1 * | 11/2013 | Hannig; Hans-Juergen | E04F 15/105 428/100 |
| 2014/0007539 | A1 * | 1/2014 | Pervan | E04F 15/02038 52/588.1 |
| 2014/0033633 | A1 * | 2/2014 | Kell | E04F 15/02033 52/588.1 |
| 2014/0215946 | A1 * | 8/2014 | Roy | E04F 15/02 52/309.1 |
| 2014/0352248 | A1 | 12/2014 | Whispell et al. | |
| 2015/0000221 | A1 * | 1/2015 | Boo | E04C 2/40 52/588.1 |
| 2015/0240500 | A1 * | 8/2015 | Stevens, Jr. | E04F 15/02038 52/588.1 |
| 2016/0138274 | A1 * | 5/2016 | Anspach | E04F 15/02038 52/177 |
| 2016/0333595 | A1 * | 11/2016 | Cappelle | E04F 15/02038 |
| 2017/0067261 | A1 * | 3/2017 | Hannig | E04F 15/02038 |
| 2017/0089078 | A1 * | 3/2017 | Schacht | E04F 15/02 |
| 2017/0101785 | A1 * | 4/2017 | Cappelle | E04F 15/02194 |
| 2017/0101786 | A1 * | 4/2017 | Cappelle | E04F 15/02194 |
| 2017/0138061 | A1 * | 5/2017 | Stevens, Jr. | E04F 15/02038 |
| 2017/0175401 | A1 * | 6/2017 | Kell | E04F 15/02038 |

FOREIGN PATENT DOCUMENTS

| | | |
|---|---|---|
| WO | 2013030686 A2 | 3/2013 |
| WO | 2013118030 A2 | 8/2013 |
| WO | 2015104680 A1 | 7/2015 |

OTHER PUBLICATIONS

International Search Report and Written Opinion from PCT Application No. PCT/IB2017/050148, dated Apr. 19, 2017.
European Office Action from EP Application No. 17703794.2, dated May 19, 2020.
Office Action from corresponding EP Application No. 17703794.2, dated Nov. 6, 2020.

* cited by examiner

FLOOR PANEL FOR FORMING A FLOOR COVERING

BACKGROUND OF THE INVENTION

Field of the Invention

The present invention relates to a floor panel for forming a floor covering.

More particularly, the present invention relates to a floor panel for forming a floor covering, of the type wherein the floor panel comprises a layer-shaped substrate, as well as a decorative top layer situated above the substrate; wherein the floor panel is rectangular, either oblong or square, and comprises a first pair of opposite edges and a second pair of opposite edges; wherein the first pair of opposite edges is provided with coupling parts, which allow effecting a coupled condition between two of such floor panels by means of a rotation movement around an axis parallel to the plane of the floor covering and parallel to the edges to be coupled; wherein the coupling parts at the first pair of opposite edges substantially are manufactured of the material of the substrate; wherein the coupling parts at the first pair of opposite edges substantially are realized in the form of a tongue and a groove, which are provided with locking parts, which, in the coupled condition of two of such floor panels, counteract the moving apart of the coupled floor panels in a direction perpendicular to the coupled edges and parallel to the plane of the floor covering; wherein the groove is bordered by an upper lip and a lower lip, which lower lip, in distal direction, extends beyond the distal end of the upper lip and, beyond the distal end of the upper lip, comprises a locking part in the form of an upward-directed locking part; wherein the second pair of opposite edges is provided with coupling parts, which allow effecting a coupled condition between two of such floor panels by means of a substantially downward movement according to a direction perpendicular to the plane of the floor covering; and wherein the coupling parts at the first and the second pair of opposite edges allow effecting a coupled condition between a plurality of such floor panels by means of a fold-down movement.

Such type of floor panel is known in general and forms an example of a so-called fold-down type of floor panel.

What is meant by such fold-down type of floor panel is generally known in the state of the art, however, for clarity's sake is illustrated in the accompanying FIG. 1.

FIG. 1 represents a partially installed floor covering which is composed of floor panels 1 of the aforementioned type. These floor panels 1, thus, at least at one pair of opposite edges 2-3, here the long edges, comprise coupling parts of the so-called "pivot type", and on the other pair of opposite edges 4-5, here the short edges, coupling parts of the so-called "push-down", "push-lock" or "drop" type.

Herein, it is noted that the specific configuration of the coupling parts at the respective edges is not explicitly represented in the figure.

In particular, various rows of such already installed floor panels 1 are represented, as well as a floor panel 1 which still has to be installed, namely, the floor panel 1 in the inclined position. This floor panel 1 must be coupled at its long edge 2 to the long edges 3 of the respective floor panels 1 in the preceding row and at its short edge 5 to the short edge 4 of the floor panel 1 in the same row.

Due to the specific configuration of the coupling parts as described herein above, the floor panel 1, starting from its inclined position, can be coupled in a single movement F at its long edge 2 as well as at its short edge 5 to the respective already installed floor panels 1.

The fold-down movement thus offers the possibility of providing a floor covering in a very simple and efficient manner.

In practice, the actual fold-down movement F also is preceded by a lateral shifting movement of the floor panel 1 to be installed. This shifting movement is illustrated in greater detail in FIG. 2 and indicated therein by the reference letter S.

The shifting movement S has to be performed because the floor panel 1 to be installed typically is provided with its long edge 2 at the long edges 3 of the floor panels 1 in the preceding row at a distance X from the floor panel 1 in the same row and thus still has to be brought with its edge 5 into the proximity of the edge 4 of the already installed floor panel in the same row.

However, this shifting movement is not always performed equally smooth and may impede the installation process of the floor covering. As an example, when performing the shifting movement, the edge 2 of the floor panel 1 to be installed can come loose from the edge 3 of the already installed floor panel. What is meant herewith is illustrated in greater detail in FIG. 3.

FIG. 3, in an enlarged view, shows that part of the floor covering which is indicated by reference F3 in FIG. 2. In particular, it represents the situated where the edge 2, at a distance Z, has come loose from the edge 3 during performing of the herein above-described shifting movement. Such situation is not desirable. In fact, hereby gaps and/or height differences may occur between the mutually coupled floor panels in the final coupled condition of the floor panels 1.

That the shifting movement is not performed in a smooth manner in fact often occurs with floor panels which are made relatively thin, and wherein the layer-shaped substrate of which is of the rigid type and more particularly is made on the basis of a thermoplastic material of the rigid type.

SUMMARY OF THE DISCLOSURE

The present invention primarily aims at an alternative floor panel for forming a floor covering, of the aforementioned type, wherein according to various preferred embodiments solutions are offered to problems with floor panels of the state of the art.

To this aim, the present invention, according to a first independent aspect thereof, relates to a floor panel for forming a floor covering, of the aforementioned type, with the characteristic that said upward-directed part extends over a height which is more than 0.1 times the thickness of the floor panel. By this characteristic, the advantage is obtained that the floor panel can be installed in a smoother manner. The relatively pronouncedly formed upward-directed part in fact provides for that the risk of the respective edges coming loose during the herein above-described shifting movement can be reduced.

It is also noted that by the height over which the upward-directed part is extending the vertical distance is meant between there, where the upward-directed part begins and there, where the upward-directed part reaches its most upward-situated point.

The mentioned advantage can be pronounced even more in the case that the aforementioned height, over which the upward-directed part is extending, is at least 0.15 times and preferably even at least 0.2 times the thickness of the floor panel.

Preferably, said height over which the upward-directed part is extending is maximum 0.33 times, more preferably maximum 0.3 times and still more preferably maximum 0.25 times the thickness of the floor panel. This in fact provides for that the shifting movement can be performed without too much hindrance from the locking part and an effect, such as slip-stick, can be avoided.

In a preferred embodiment, the most upward-situated point of said upward-directed part is situated at a height in respect to the underside of the floor panel which is at least 0.45 times the thickness of the floor panel.

However, said height of the most upward-situated point of the upward-directed part preferably is maximum 0.75 times, more preferably maximum 0.6 times and still more preferably maximum 0.5 times the thickness of the floor panel.

The risk that the respective edges may come loose during the herein above-described shifting movement can still be reduced in the case that said locking parts comprise locking surfaces, which, in the coupled condition of two of such floor panels, define a tangent line forming an angle with the plane of the floor covering which is situated between 50 and 90 degrees, borders included. Preferably, said angle even is larger than 60 degrees, however, best is smaller than 80 degrees and still better smaller than 70 degrees.

It is also noted that the locking surfaces do not necessarily have to be flat but may also be curved. In the case of curved or bent locking surfaces, they may define, in the coupled condition, a plurality of tangent lines, however, then, in accordance with the herein above-described embodiment, they define at least a tangent line forming an angle, as herein above-mentioned, with the plane of the floor covering.

Notwithstanding the pronounced upward-directed part, the smoothness of coupling of the tongue and the groove still can be guaranteed in the case that the lower lip extends over a horizontal distance beyond the distal end of the upper lip of at least 0.85 times, preferably even at least 0.9 times and still more preferably at least 1 time the thickness of the floor panel. This in fact allows providing the required elasticity at the lower lip, such that it possibly can be bent in a simple manner during the coupling process.

However, preferably said horizontal distance over which the lower lip extends beyond the distal end of the upper lip is maximum 1.5 times, more preferably maximum 1.2 times and still better maximum 1.1 times the thickness of the floor panel. This allows realizing the lower lip still stable.

The coupling smoothness of the tongue and the groove can be improved even more by having said lower lip show a minimum thickness of maximum 0.3 times the thickness of the floor panel. However, this minimum thickness preferably is minimum 0.1 times and more preferably minimum 0.2 times the thickness of the floor panel, and such in order to be able to realize the lower lip still stable.

In a particular embodiment, said lower lip reaches its minimum thickness there, where said upward-directed part is beginning. This is particularly advantageous in view of the fact that the lower lip, on the one hand, there, where the upward-directed part is beginning, can be made rather elastic and consequently there is easy to bent, and, on the other hand, at other locations, for example, there, where it forms a connection with the actual floor panel, can be made relatively sturdy and stable.

Preferably, the horizontal distance between the most inward-situated or most proximally situated point of the groove and the distal end of the upper lip is maximum 0.6 times or maximum 0.5 times the thickness of the floor panel, however, preferably this horizontal distance is minimum 0.3 times and still better minimum 0.35 times the thickness of the floor panel. With such relatively shallow groove, the advantage is obtained that the present invention can be applied with relatively thin floor panels. In such floor panels, the shallow groove provides for that the weakening as a result of the application of the groove can be restricted.

A particular advantage of the present invention consists in that even with such shallow groove the smoothness of installation can be guaranteed. Irrespective of the fact that the shallow groove provides for that the risk of a coming loose of the edges, more particularly coming loose of the tongue and the groove, when performing the shifting movement is rather large, the inventor has found that the invention allows limiting this risk considerably.

For the above-mentioned reasons, the present invention is applied particularly advantageously in thin floor panels, such as floor panels having a thickness of maximum 8 mm, preferably floor panels having a thickness of maximum 7 mm, and still more in floor panels having a thickness of maximum 6 mm, however, wherein the thickness thereof preferably is at least 4 mm.

Preferably, in the coupled condition of two of such floor panels a contact is formed between the locking surfaces of the aforementioned locking parts, and a space is present on a lower side of the tongue which extends from said contact to beyond the distal end of the upper lip. In that such space is provided, the advantage is obtained that the smoothness of installation can be guaranteed, in that, for example, possible tolerances in the manufacture of the coupling parts can be accommodated.

In an embodiment, in the coupled condition of two of such floor panels a contact is formed between an upper side of the tongue and a lower side of the upper lip, as well as proximally from the distal end of the upper lip a contact between a lower side of the tongue and an upper side of the lower lip.

In particular, in the coupled condition also a contact is formed between the locking surfaces of the locking parts, and there is a space present on a lower side of the tongue, which extends from the last-mentioned contact to the contact formed between the lower side of the tongue and the upper side of the lower lip.

Preferably, in the coupled condition of two of such floor panels, the distal end of the lower lip of the one floor panel is separated from the other floor panel. This offers the possibility for a possible bending of the lower lip during the coupling process, which enhances the smoothness of installation.

The coupling parts of the first pair of opposite edges preferably allow effecting a snap coupling.

The present invention can be applied in a particularly advantageous manner in the case that said substrate comprises at least one layer which is realized on the basis of a composition which comprises at least a thermoplastic synthetic material, wherein said composition is free from plasticizers or comprises plasticizers in an amount of less than 20 phr and preferably in an amount between 5 and 15 phr.

A particular advantage of the invention is in fact that even with such substrates or substrate layers of the rigid or stiff type the smoothness of installation still can be guaranteed. Irrespective of the fact that such substrate or substrate layer increases the risk of the edges coming loose when performing said shifting movement, in particular because in a mutual shifting of the edges there is relatively little friction, contrary to, for example, substrates or substrate layers of the supple type, the inventor has found that the measures of the invention allow restricting this risk drastically.

Preferably, the aforementioned layer forms at least half of the thickness of the floor panel.

The advantages of the invention are particularly prominent in the case that the coupling parts of the first pair of opposite edges substantially are realized in the aforementioned layer.

The above-mentioned layer and/or the composition can also show one or more of the following characteristics:
- the composition also comprises at least fillers and/or mineral fiber structures;
- the above-mentioned thermoplastic synthetic material is selected from the following group: polyvinyl chloride, polyethylene, polypropylene, polyethylene terephthalate or a combination of two or more of the above; and/or
- the aforementioned layer is foamed.

The herein above-mentioned fillers may concern inorganic fillers, such as talc, chalk and/or limestone, or, whether or not in combination with these inorganic fillers, organic fillers such as wood and/or bamboo particles.

The above-mentioned substrate can be made multi-layered and, apart from the above-mentioned layer, preferably also comprises a more supple layer situated there above. This more supple layer can be made on the basis of a thermoplastic synthetic material of the supple type, such as supple polyvinyl chloride. Preferably, the more supple layer is of the LVT or Luxury Vinyl Tile type.

The floor panel may also comprise a counter layer which is situated underneath said substrate. An example of such counter layer is a layer of cork, which can impart acoustic properties to the floor panel.

The decorative top layer of the floor panel preferably comprises at least a decor and moreover may also comprise a transparent or translucent wear layer situated above the decor.

It is also noted that the coupling parts at the aforementioned second pair of opposite edges may show one or more of the following characteristics, as far as they are not contradictory:
- the coupling parts comprise a locking system, which allows effecting a locking between two of such floor panels in a direction perpendicular to the plane of the floor covering;
- the coupling parts comprise a locking system, which allows effecting a locking between two of such floor panels in a direction parallel to the plane of the floor covering and perpendicular to the coupled edges;
- the coupling parts comprise only one of the aforementioned locking systems;
- the coupling parts comprise both aforementioned locking systems;
- the locking system, which allows effecting a locking between two of such floor panels in a direction perpendicular to the plane of the floor covering is formed by locking parts which substantially are made from the material of the substrate;
- the locking system, which allows effecting a locking between two of such floor panels in a direction perpendicular to the plane of the floor covering is formed by locking parts of which at least one locking part is formed by a separate insertion piece or insert.

It is also noted that the coupling parts at the first pair of opposite edges and/or the coupling parts at the second pair of opposite edges may be performed such that they fit into each other with a so-called pretension, as is known as such from WO 97/47834 A1.

Although the present invention preferably is applied with floor panels with a thermoplastic substrate of the rigid or stiff type, or anyhow at least comprise such substrate layer, it is not excluded that the invention is applied with floor panels with a thermoplastic substrate of the supple type, or anyhow at least comprise such substrate layer, and the coupling parts at the first pair of opposite edges then substantially are realized in this supple thermoplastic substrate layer, or with wood-based floor panels, such as floor panels with a substrate of MDF, HDF or particle board.

It is also noted that various of the herein above-mentioned measures as such form inventive ideas in combination with their application in thin floor panels with a thermoplastic substrate layer of the rigid type, independent of the characteristic that said upward-directed part extends over a height which is more than 0.1 times the thickness of the floor panel. This is why the present invention, according to an independent second aspect, also relates to a floor panel for forming a floor covering, of the aforementioned type, with the characteristic that the thickness of the floor panel is maximum 8 mm, preferably maximum 7 mm and more preferably maximum 6 mm; that said substrate comprises at least one layer which is made on the basis of a composition comprising at least a thermoplastic synthetic material; that said composition is free from plasticizers or comprises plasticizers in an amount of less than 20 phr and preferably in an amount between 5 and 15 phr; and that the floor panel also has one or more of the following characteristics:
- the most upward-directed point of said upward-directed part is situated at a height in respect to the underside of the floor panel which is at least 0.45 times the thickness of the floor panel;
- the aforementioned locking parts comprise locking surfaces which, in the coupled condition of two of such floor panels, define a tangent line forming an angle with the plane of the floor covering which is situated between 50 and 90 degrees, borders included;
- the aforementioned lower lip extends over a horizontal distance beyond the distal end of the upper lip of at least 0.85 times, preferably at least 0.9 times and more preferably at least 1 time the thickness of the floor panel;
- the aforementioned lower lip has a minimum thickness of maximum 0.3 times and preferably minimum 0.1 times and more preferably minimum 0.2 times the thickness of the floor panel; and/or
- in the coupled condition of two of such floor panels, a contact is formed between the locking surfaces of the locking parts and a space is present at a lower side of the tongue which extends from the aforementioned contact to beyond the distal side of the upper lip.

It is also noted that this independent second aspect can be combined at choice with any of the characteristics of the first aspect, independent of the characteristic that said upward-directed part extends over a height which is more than 0.1 times the thickness of the floor panel.

BRIEF DESCRIPTION OF THE DRAWINGS

With the intention of better showing the characteristics of the invention, herein below, as an example without any limitative character, some preferred embodiments are described, with reference to the accompanying drawings, wherein.

DETAILED DESCRIPTION OF PREFERRED EMBODIMENTS OF THE INVENTION

Figure 4:
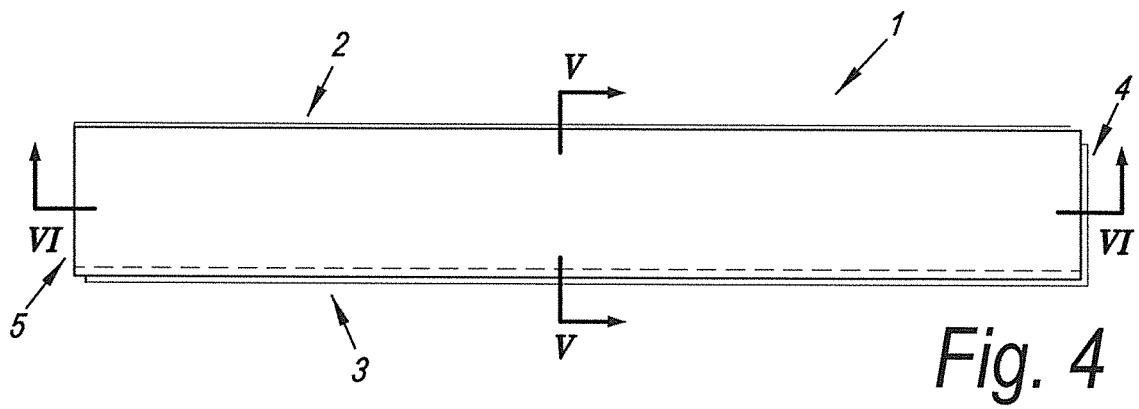
FIG. 4 represents in top view a floor panel according to the present invention.

FIG. 4 represents a floor panel 1 according to the present invention.

The floor panel 1 is rectangular and in this case oblong and comprises a first pair of opposite edges 2-3, which form the long edges, and a second pair of opposite edges 4-5, which form the short edges.

Figure 5:
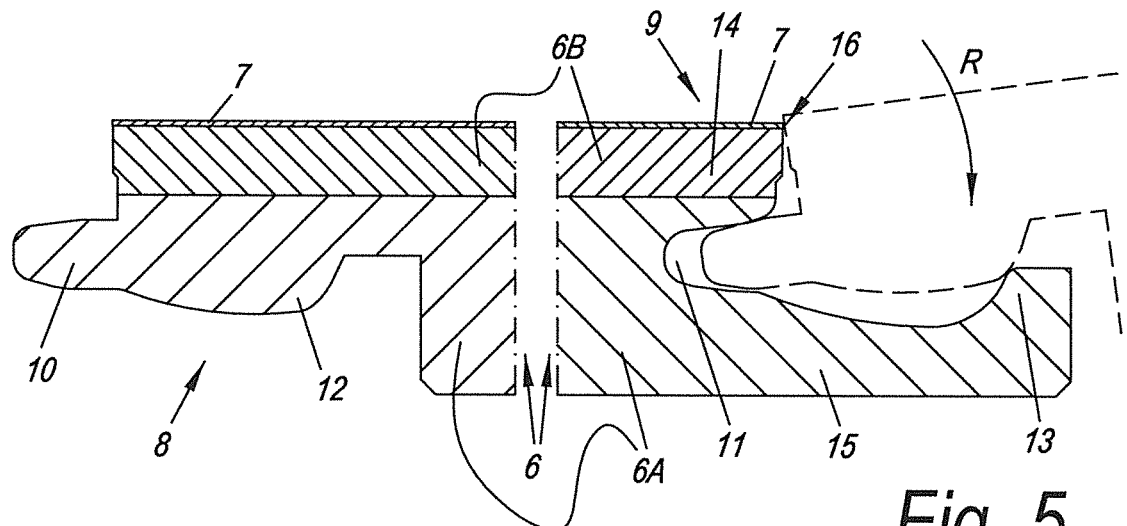
FIG. 5 represents a cross-section according to line V-V in FIG. 4.

FIG. 5 represents a cross-section according to line V-V in FIG. 4.

The floor panel 1 comprises a layer-shaped substrate 6, as well as a decorative top layer 7 situated above the substrate 6.

Said substrate 6 comprises at least one layer 6A, which is made on the basis of a composition comprising at least a thermoplastic synthetic material, wherein said composition is free from plasticizers or comprises plasticizers in an amount of less than 20 phr and preferably in an amount between 5 and 15 phr. Further, the composition may be realized as described herein above in the introduction.

The layer 6A forms at least half of the thickness T of the floor panel 1.

Said substrate 2 here is multi-layered and, apart from the layer 6A, also comprises a more supple layer 6B situated above the layer 6A. This more supple layer 6B may be realized such as described in the introduction.

Said top layer 7 preferably comprises at least a decor, as well as a transparent or translucent wear layer situated above the decor.

The first pair of opposite edges 2-3 is provided with coupling parts 8-9, which allow effecting a coupled condition between two of such coupling parts 1 by means of a rotation movement R around an axis parallel to the plane of the floor covering and parallel to the edges 2-3 to be coupled.

The coupling parts 8-9 substantially are made from the material of the substrate 6 and more particularly substantially in the aforementioned layer 6A.

Substantially, they are realized in the form of a tongue 10 and a groove 11, which are provided with locking parts 12-13, which, in the coupled condition of two of such floor panels 1, counteract the moving apart of the coupled floor panels 1 in a direction H perpendicular to the coupled edges 2-3 and parallel to the plane of the floor covering.

The groove 11 is bordered by an upper lip 14 and a lower lip 15, which lower lip 15 in distal direction reaches beyond the distal end 16 of the upper lip 14 and, beyond the distal end 16 of the upper lip 14, comprises a locking part 13 in the form of an upward-directed locking part 13.

Figure 6:
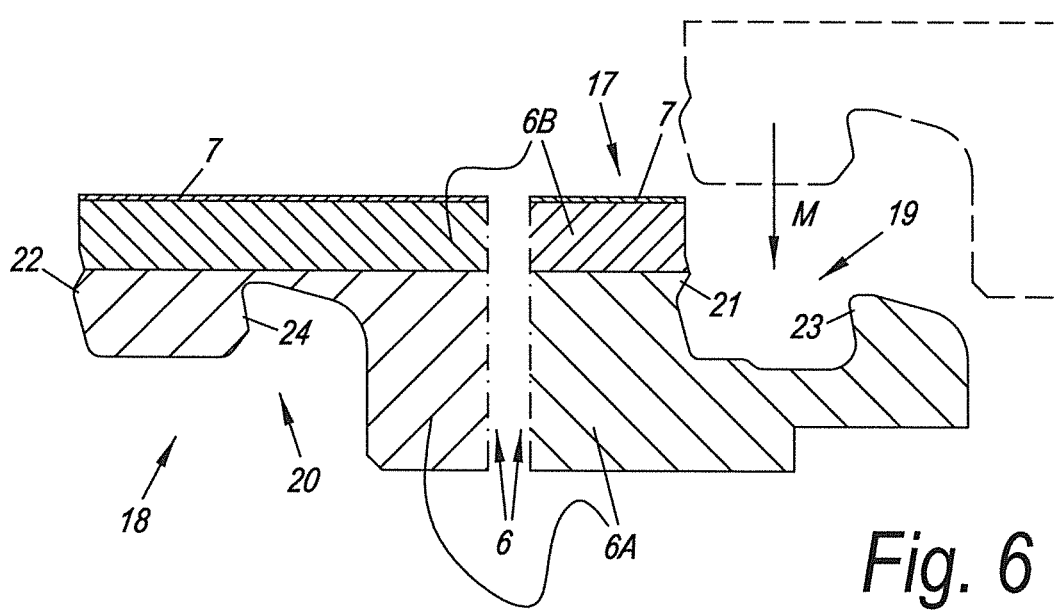
FIG. 6 represents a cross-section according to line VI-VI in FIG. 4.

FIG. 6 represents a cross-section according to line VI-VI in FIG. 4.

The second pair of opposite edges 4-5 is provided with coupling parts 17-18, which allow effecting a coupled condition between two of such floor panels 1 by means of a substantially downward movement M according to a direction perpendicular to the plane of the floor covering.

The coupling parts 17-18 here are made as hook-shaped portions 19-20, which form a locking system which allows effecting a locking between two of such floor panels 1 in a direction parallel to the plane of the floor covering and perpendicular to the coupled edges 4-5.

Here, the coupling parts 17-18 further comprise locking parts 21-22 and locking parts 23-24, which each form a locking system which allows effecting a locking between two of such floor panels 1 in a direction perpendicular to the plane of the floor covering.

Figure 1:
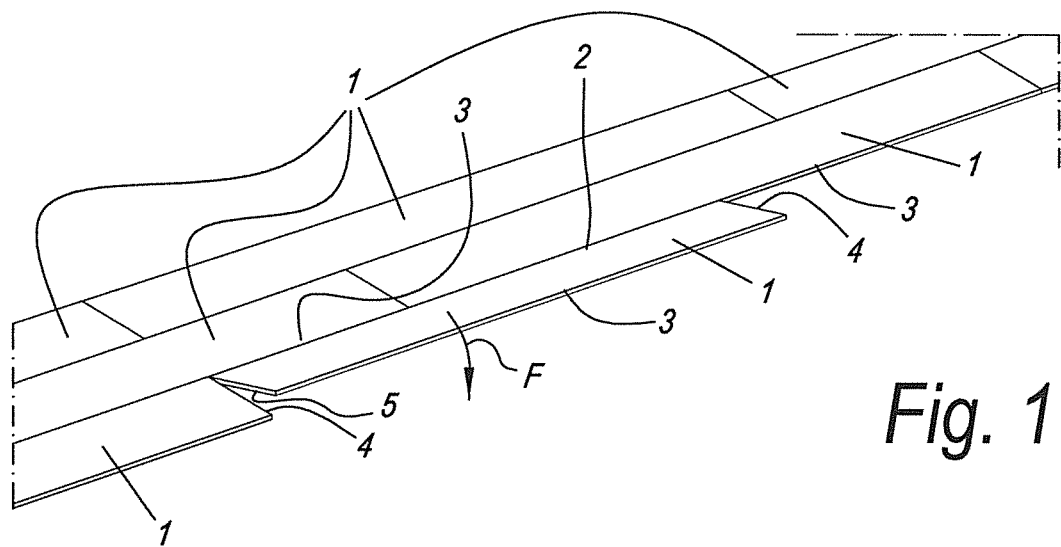
FIG. 1 represents a partially installed floor covering which is composed of floor panels of the so-called fold-down type.
Figure 2:
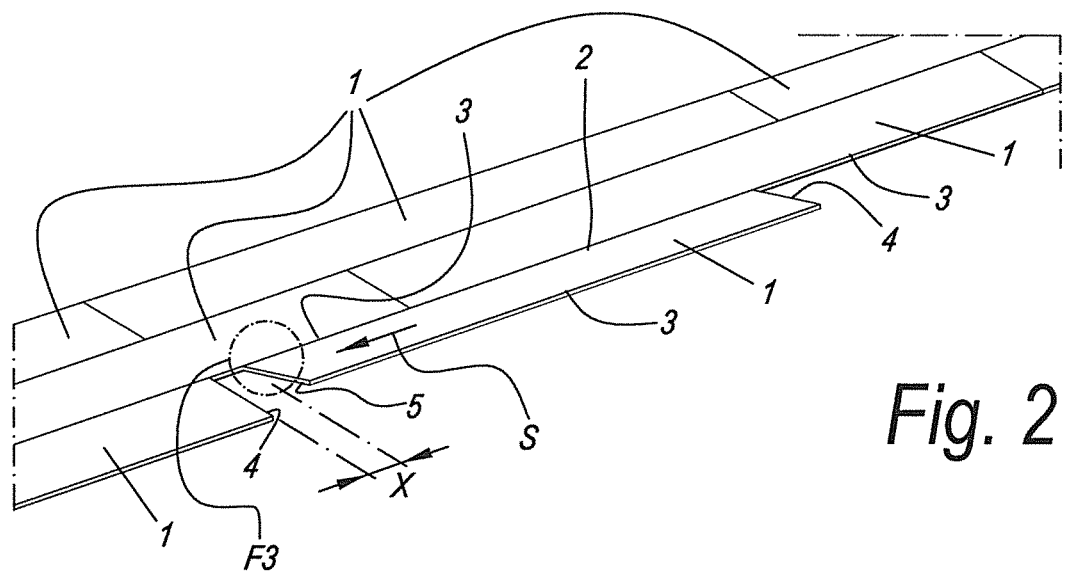
FIG. 2 represents the shifting movement which in practice precedes the actual fold-down movement.
Figure 3:
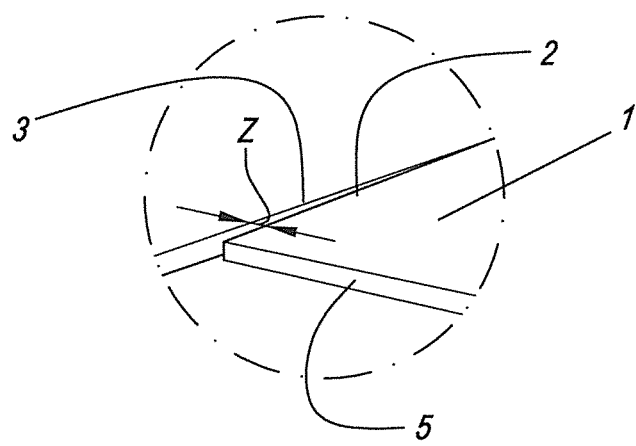
FIG. 3 represents an enlarged view of that part of the floor covering which is indicated by reference F3 in FIG. 2.

The coupling parts 8-9 and 17-18 at the first and the second pair of opposite edges 2-3 and 4-5 allow effecting a coupled condition between a plurality of such floor panels 1 by means of a fold-down movement F, as illustrated in FIG. 1.

Figure 7:
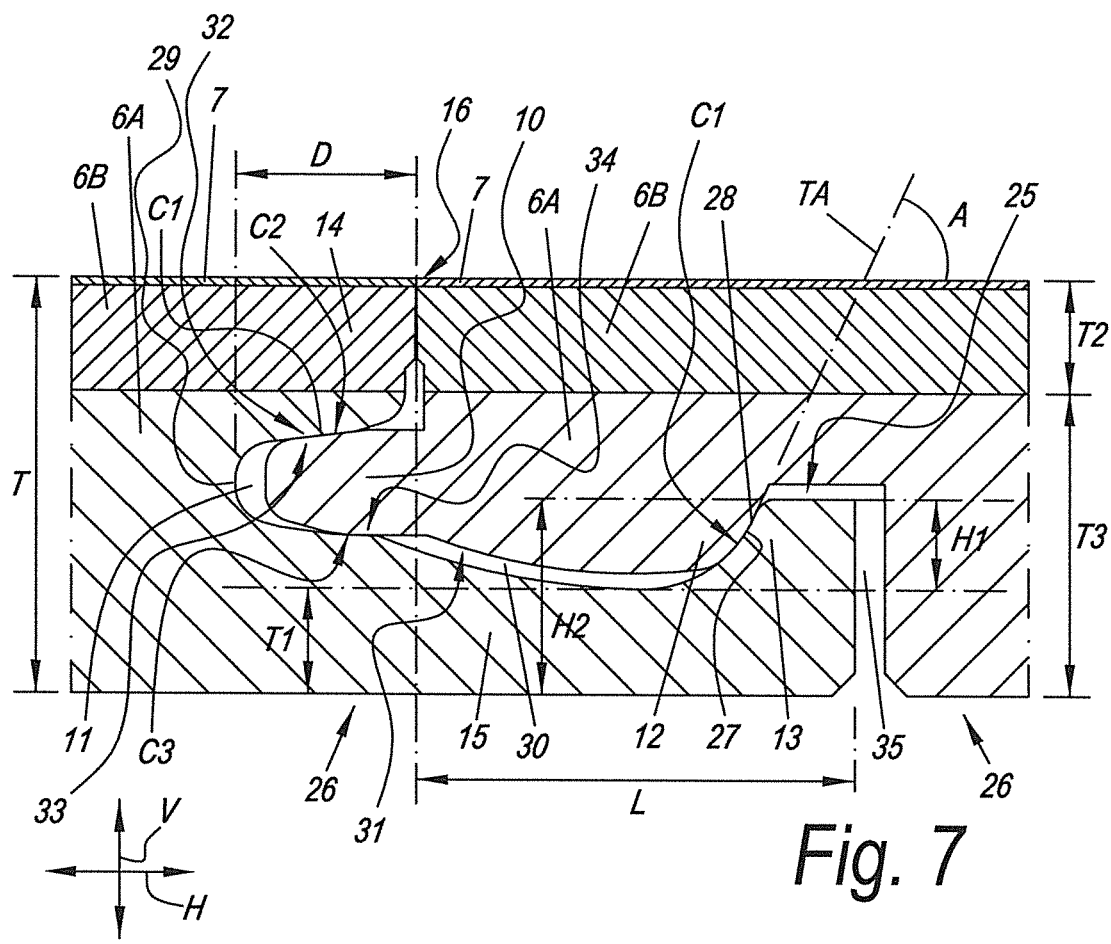
FIG. 7 represents an enlarged view of the edges from FIG. 5, however, in the coupled condition of the edges.

FIG. 7 represents in an enlarged view the edges 2-3 from FIG. 5, however, in the coupled condition of the edges 2-3.

The aforementioned upward-directed part 13 extends over a height H1 which is more than 0.1 times the thickness T of the floor panel 1. Preferably, the height H1 is at least 0.15 times and more preferably minimum 0.2 times the thickness T of the floor panel 1. However, the thickness H1 preferably is maximum 0.33 times, more preferably maximum 0.3 times and still more preferably maximum 0.25 times the thickness T of the floor panel 1.

The most upward-situated point 25 of said upward-directed part 13 is situated at a height H2 in respect to the underside 26 of the floor panel 1 which is at least 0.45 times the thickness T of the floor panel 1. Preferably, this height H2 is maximum 0.75 times, more preferably maximum 0.6 times and still more preferably maximum 0.5 times the thickness T of the floor panel 1.

The locking parts 12-13 comprise locking surfaces 27-28, which, in the coupled condition of two of such floor panels 1, define a tangent line TA which forms an angle A with the plane of the floor covering situated between 50 and 90 degrees, borders included. Said angle A preferably is larger than 60 degrees, however, preferably smaller than 80 degrees and more preferably smaller than 70 degrees. In this case, the angle A is 65 degrees.

Said lower lip 15 extends over a horizontal distance L beyond the distal end 16 of the upper lip 14 of at least 0.85 times, preferably at least 0.9 times and more preferably at least 1 time the thickness T of the floor panel 1. However, this distance L preferably is maximum 1.5 times, more preferably maximum 1.2 times and still more preferably maximum 1.1 times the thickness T of the floor panel 1.

Said lower lip 15 has a minimum thickness T1 of maximum 0.3 times and preferably minimum 0.1 times and more preferably minimum 0.2 times the thickness T of the floor panel 1. In this case, the lower lip 15 reaches its minimum thickness T1 there, where said upward-directed part 13 is beginning.

The horizontal distance D between the most inward-situated or most proximally situated point 29 of the groove 11 and the distal end 16 of the upper lip 14 is maximum 0.6 times and preferably maximum 0.5 times the thickness T of the floor panel 1. However, this horizontal distance D preferably is minimum 0.3 times and more preferably minimum 0.35 times the thickness T of the floor panel 1.

The thickness T of the floor panel 1 is maximum 8 mm, preferably maximum 7 mm and more preferably maximum 6 mm. Preferably, it is at least 4 mm.

In the coupled condition of two of such floor panels 1, a contact C1 is formed between the locking surfaces 27-28 of the locking parts 12-13, and a space 30 is present on a lower side 31 of the tongue 10, which extends from said contact C1 to beyond the distal end 16 of the upper lip 14.

In the coupled condition of two of such floor panels 1, a contact C2 is formed between an upper side 32 of the tongue 10 and a lower side 33 of the upper lip 14, and proximally from the distal end 16 of the upper lip 14 a contact C3 is formed between a lower side 31 of the tongue 10 and an upper side 34 of the lower lip 15.

In this case, the space 30 extends from the aforementioned contact C1 up to the contact C3 formed between the lower side 31 of the tongue 10 and the upper side 34 of the lower lip 15.

In the coupled condition of two of such floor panels 1, the distal end 35 of the lower lip 15 of the one floor panel 1 is separated from the other floor panel 1.

The present invention is in no way limited to the herein above-described embodiments, on the contrary can such methods, floor panels and carrier material be realized according to various variants, without leaving the scope of the present invention.

The invention claimed is:

1. A floor panel for forming a floor covering, the floor panel comprising:
   a substrate, and
   a decorative top layer situated above the substrate;
   wherein the top layer comprises a decor and a transparent or translucent wear layer situated above the décor;
   wherein the floor panel is rectangular, either oblong or square, and comprises a first pair of opposite edges and a second pair of opposite edges;
   wherein the first pair of opposite edges is provided with coupling parts, which allow effecting a coupled condition between two of such floor panels by means of a rotation movement around an axis parallel to a plane of the floor covering and parallel to the edges to be coupled;
   wherein the coupling parts at the first pair of opposite edges substantially are manufactured of the material of the substrate;
   wherein the coupling parts at the first pair of opposite edges substantially are realized in the form of a tongue and a groove, which are provided with locking parts, which, in the coupled condition of two of such floor panels, counteract the moving apart of the coupled floor panels in a direction perpendicular to the coupled edges and parallel to the plane of the floor covering;
   wherein the groove is bordered by an upper lip and a lower lip, which lower lip, in distal direction, extends beyond the distal end of the upper lip, and, the portion of the lower lip that extends beyond the distal end of the upper lip comprises one of said locking parts in the form of an upward-directed locking part;
   wherein the second pair of opposite edges is provided with coupling parts, which allow effecting a coupled condition between two of such floor panels by means of a substantially downward movement according to a direction perpendicular to the plane of the floor covering;
   wherein the coupling parts at the first and the second pair of opposite edges allow effecting a coupled condition between a plurality of such floor panels at both the first pair of opposite edges and the second pair of opposite edges by a single turning movement that effects both the rotation movement respectively at the first pair of opposite edges of a first and second of such floor panels and the substantially downward movement respectively at the second pair of opposite edges of the first and a third of such floor panels;
   wherein said upward-directed part extends over a height which is more than 0.1 times the thickness of the floor panel;
   wherein the substrate is multilayered;
   wherein the substrate includes at least a first layer that is formed of a composition that includes a thermoplastic synthetic material; and
   wherein said composition of the first layer is free of plasticizers or includes plasticizers in an amount of less than 20 parts per hundred (phr);
   wherein the substrate also includes a supple layer situated above said first layer; and
   wherein the coupling parts of the first pair of opposite edges are manufactured substantially in said first layer,
   wherein said locking parts include locking surfaces to counter the moving apart of the coupled floor panels, wherein said locking surfaces define a tangent line forming an angle with the plane of the floor covering which is between 60 and 80 degrees.

2. The floor panel of claim 1, wherein said height, over which the upward-directed part extends, is at least 0.15 times the thickness of the floor panel.

3. The floor panel of claim 1, wherein said height, over which the upward-directed part extends, is maximum 0.33 times the thickness of the floor panel.

4. The floor panel of claim 1, wherein the most upward-situated point of said upward-directed part is situated at a height in respect to the underside of the floor panel, which is at least 0.45 times the thickness of the floor panel.

5. The floor panel of claim 4, wherein said height of the most upward-situated point of the upward-directed part is maximum 0.75 times the thickness of the floor panel.

6. The floor panel of claim 1, wherein said lower lip extends over a horizontal distance beyond the distal end of the upper lip of at least 0.85 times the thickness of the floor panel.

7. The floor panel of claim 6, wherein said horizontal distance over which the lower lip extends beyond the distal end of the upper lip is maximum 1.5 times the thickness of the floor panel.

8. The floor panel of claim 1, wherein the thickness of the floor panel is maximum 8 mm.

9. The floor panel of claim 8, wherein the thickness of the floor panel is at least 4 mm.

10. The floor panel of claim 1, wherein the first layer forms at least half of the thickness of the floor panel.

11. The floor panel of claim 1, wherein the composition also comprises at least fillers and/or mineral fiber structures.

12. The floor panel of claim 1, wherein the first layer is foamed.

13. The floor panel of claim 1, wherein the thermoplastic synthetic material is selected from the following group: polyvinyl chloride, polyethylene, polypropylene, polyethylene terephthalate or a combination of two or more of the above.

14. The floor panel of claim 1, wherein the supple layer that includes a thermoplastic synthetic material of the supple type.

15. The floor panel of claim 1, wherein said upward-directed part extends over a height which is 0.1 to 0.25 times the thickness of the floor panel.

16. The floor panel of claim 1, wherein said upward-directed part extends over a height which is 0.2 to 0.3 times the thickness of the floor panel.

17. The floor panel of claim 1, wherein said locking parts include locking surfaces to counter the moving apart of the coupled floor panels, and a space is present on a lower side of the tongue, said space extending from a contact of said locking surfaces to at least below the distal end of the upper lip.

18. A floor panel for forming a floor covering, the floor panel comprising:
 a substrate, and
 a decorative top layer situated above the substrate;
 wherein the top layer comprises a decor and a transparent or translucent wear layer situated above the décor;
 wherein the floor panel is rectangular, either oblong or square, and comprises a first pair of opposite edges and a second pair of opposite edges;
 wherein the first pair of opposite edges is provided with coupling parts, which allow effecting a coupled condition between two of such floor panels by means of a rotation movement around an axis parallel to a plane of the floor covering and parallel to the edges to be coupled;
 wherein the coupling parts at the first pair of opposite edges substantially are manufactured of the material of the substrate;
 wherein the coupling parts at the first pair of opposite edges substantially are realized in the form of a tongue and a groove, which are provided with locking parts, which, in the coupled condition of two of such floor panels, counteract the moving apart of the coupled floor panels in a direction perpendicular to the coupled edges and parallel to the plane of the floor covering;
 wherein the groove is bordered by an upper lip and a lower lip, which lower lip, in distal direction, extends beyond the distal end of the upper lip, and, the portion of the lower lip that extends beyond the distal end of the upper lip comprises one of said locking parts in the form of an upward-directed locking part;
 wherein the second pair of opposite edges is provided with coupling parts, which allow effecting a coupled condition between two of such floor panels by means of a substantially downward movement according to a direction perpendicular to the plane of the floor covering;
 wherein the coupling parts at the first and the second pair of opposite edges allow effecting a coupled condition between a plurality of such floor panels at both the first pair of opposite edges and the second pair of opposite edges by a single turning movement that effects both the rotation movement respectively at the first pair of opposite edges of a first and second of such floor panels and the substantially downward movement respectively at the second pair of opposite edges of the first and a third of such floor panels;
 wherein said upward-directed part extends over a height which is more than 0.1 times the thickness of the floor panel;
 wherein the substrate is multilayered;
 wherein the substrate includes at least a first layer that is formed of a composition that includes a thermoplastic synthetic material; and
 wherein said composition of the first layer is free of plasticizers or includes plasticizers in an amount of less than 20 parts per hundred (phr);
 wherein the substrate also includes a supple layer situated above said first layer; and
 wherein the coupling parts of the first pair of opposite edges are manufactured substantially in said first layer, wherein said composition of the first layer includes plasticizers in an amount between 5 and 15 phr.

19. A floor panel for forming a floor covering, the floor panel comprising:
 a substrate, and
 a decorative top layer situated above the substrate;
 wherein the top layer comprises a decor and a transparent or translucent wear layer situated above the décor;
 wherein the floor panel is rectangular, either oblong or square, and comprises a first pair of opposite edges and a second pair of opposite edges;
 wherein the first pair of opposite edges is provided with coupling parts, which allow effecting a coupled condition between two of such floor panels by means of a rotation movement around an axis parallel to a plane of the floor covering and parallel to the edges to be coupled;
 wherein the coupling parts at the first pair of opposite edges substantially are manufactured of the material of the substrate;
 wherein the coupling parts at the first pair of opposite edges substantially are realized in the form of a tongue and a groove, which are provided with locking parts, which, in the coupled condition of two of such floor panels, counteract the moving apart of the coupled floor panels in a direction perpendicular to the coupled edges and parallel to the plane of the floor covering;
 wherein the groove is bordered by an upper lip and a lower lip, which lower lip, in distal direction, extends beyond the distal end of the upper lip, and, the portion of the lower lip that extends beyond the distal end of the upper lip comprises one of said locking parts in the form of an upward-directed locking part;
 wherein the second pair of opposite edges is provided with coupling parts, which allow effecting a coupled condition between two of such floor panels by means of a substantially downward movement according to a direction perpendicular to the plane of the floor covering;
 wherein the coupling parts at the first and the second pair of opposite edges allow effecting a coupled condition between a plurality of such floor panels at both the first pair of opposite edges and the second pair of opposite edges by a single turning movement that effects both the rotation movement respectively at the first pair of opposite edges of a first and second of such floor panels and the substantially downward movement respectively at the second pair of opposite edges of the first and a third of such floor panels;
 wherein said upward-directed part extends over a height which is more than 0.1 times the thickness of the floor panel;
 wherein the substrate is multilayered;
 wherein the substrate includes at least a first layer that is formed of a composition that includes a thermoplastic synthetic material; and
 wherein said composition of the first layer is free of plasticizers or includes plasticizers in an amount of less than 20 parts per hundred (phr);
 wherein the substrate also includes a supple layer situated above said first layer; and
 wherein the coupling parts of the first pair of opposite edges are manufactured substantially in said first layer,
 wherein the coupling parts at the first pair of opposite edges are configured such that in coupled condition of the floor panel at its first pair of opposite edges with an other of such floor panel, the distal end of the lower lip of the floor panel is separated from the other such floor panel.

\* \* \* \* \*